No. 803,700. PATENTED NOV. 7, 1905.
W. P. MEEKER.
MOLDING APPARATUS.
APPLICATION FILED NOV. 12, 1904.

Witnesses
Edward Rowland
W. D. Neilley

Inventor
William Passmore Meeker
By his Attorney
Andrew Wilson

UNITED STATES PATENT OFFICE.

WILLIAM PASSMORE MEEKER, OF NEWARK, NEW JERSEY.

MOLDING APPARATUS.

No. 803,700. Specification of Letters Patent. Patented Nov. 7, 1905.

Application filed November 12, 1904. Serial No. 232,402.

*To all whom it may concern:*

Be it known that I, WILLIAM PASSMORE MEEKER, a citizen of the United States, residing at Newark, Essex county, New Jersey, have invented certain new and useful Improvements in Molding Apparatus, of which the following is a specification.

My invention relates to apparatus for molding from a soft or plastic material articles having smooth faces or surfaces; and my improvements consist in certain novel features in the dies and molds for making such articles, the details of which I will now proceed to describe, referring in so doing to the drawings, in which—

Figure 1:
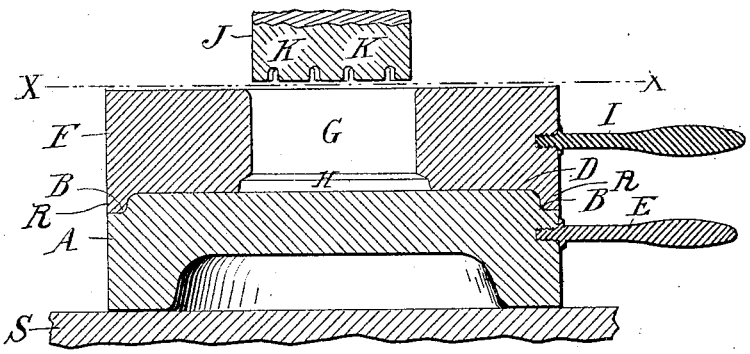
Figure 2:
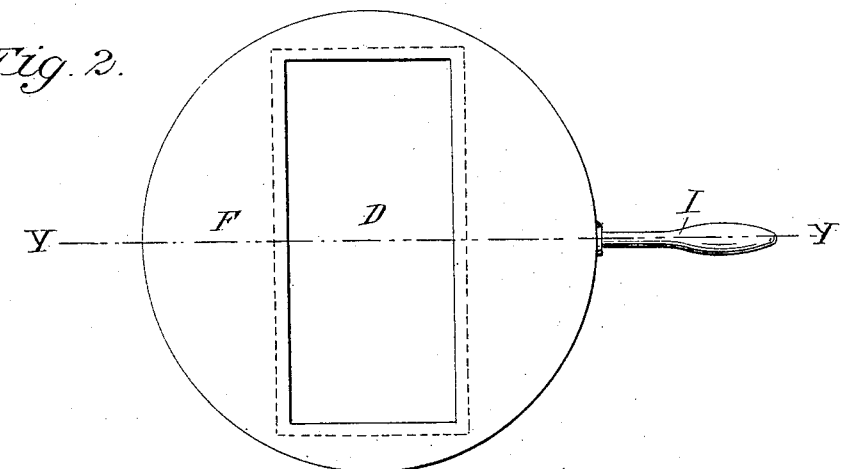
Figure 3:
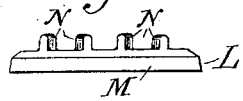
Figure 4:
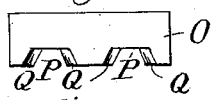
Figure 6:
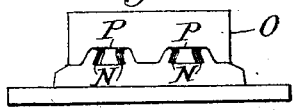
Figure 5:
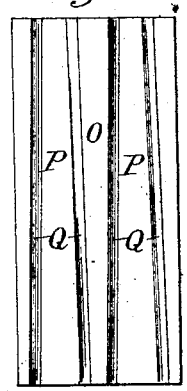

Figure 1 is a cross-sectional view of the press-mold, taken on the line $y\,y$ of Fig. 2, which is a plan view of the same taken on the line $x\,x$ of Fig. 1. Fig. 3 is an end view of an article after it has been formed in this press-mold. Fig. 4 is an end view, and Fig. 5 is a bottom view, of the upsetting-die; and Fig. 6 is an end view of the upsetting-die in position upon the molded article.

Similar letters of reference designate similar parts in all the figures.

The base A of the press-mold is formed with a smooth upper surface D, adapted to give the desired form to the face of the molded article, which in the drawings is shown as a tile. Upon the base A rests the cap F, recessed at G, in the form of the outline and edges of the article and having undercut edges at H to form beveled edges thereupon. The base A and cap F are so connected that they may be moved relative to each other without thereby altering the shape of the mold which they form between them. In the device illustrated in the drawings this is accomplished by providing the base with an annular rabbet B, which receives a corresponding flange R upon the cap F, thus permitting the cap to be rotated upon the base without affecting the shape of the mold. The base and cap are conveniently manipulated by means of their respective handles E and I.

In use the cap is placed on the base, and a suitable quantity of material— for instance, a plastic vitreous substance—is put into the mold, which is then slid upon the bed S of an ordinary press and pressed down by the plunger J. In the drawings I have shown the plunger J as provided with two pairs of converging grooves K K, which will form upon the upper surface of the molded article L corresponding ribs N N. The plunger is then raised, and by means of their handles the cap F and base A are rotated relative to each other, the molded article L being held in place in the cap, while its lower surface or face M is smoothed or ironed by the smooth upper surface D of the base A. This movement of the parts of the mold and the ironing operation break up any air bubbles or pockets which may have formed under the molded article, smooth out any rings, inequalities, or ridges, and free the article from the sides and bottom of the mold, so that it may be readily removed therefrom. To secure such molded articles upon a cement or similar backing, it is important that they should be provided with undercut or overhanging portions, and I secure this result by the use of a coöperating upsetting-die O, which is made of metal and has in its under side two grooves, each adapted to receive one pair of the ribs N N. The sides Q Q of these grooves incline inward toward each other, and when the article L has been pressed and the plunger has been raised and while the tile is still soft the upsetting-die O is placed upon it, upsetting the flanges N N into the overhanging position shown in Fig. 6. The upsetting-die may be used either before or after the tile has been removed from the mold. If before, then the upsetting-die is substituted for the plunger J, and if after the cap of the mold is first removed, leaving the tile upon the base, and the upsetting-die is then placed upon the tile. After the upsetting-die has performed its work and been removed the article is annealed or burned in the usual manner.

It is obvious that my apparatus may be modified in details without departing from the spirit of my invention, which consists, primarily, in using a device the upper part of which holds the molded article in place, while the lower part is moved without changing the form of the mold, so as to smooth and free the molded article.

Having thus described my invention, what I claim, and desire to secure by Letters Patent of the United States, is—

1. A press-mold formed of a cap provided with a depending flange, and a base provided with a rabbet to receive such flange, said cap and base being adapted to be moved relative to each other without changing the form of the mold.

2. A press-mold formed of a cap provided with a depending annular flange, and a base provided with an annular rabbet to receive such flange, said cap and base being adapted to be rotated relative to each other without changing the form of the mold.

3. A press-mold combining a recessed, open-bottomed cap, and a base with a continuous, unbroken face extending beneath and beyond the cap-opening and adapted to present new portions of its face beneath said cap-opening without changing the form of or producing any opening in the bottom of the mold.

4. A press-mold combining a recessed, open-bottomed cap, a base, rotatably connected therewith and having a continuous, unbroken face extending beneath and beyond the cap-opening and adapted to present new portions of its face beneath said cap-opening without changing the form of or producing any opening in the bottom of the mold.

5. The combination in a press-mold of a base provided with a circumferential, annular rabbet and a smooth upper face, a cap provided with a circumferential, depending, annular flange and a mold with downwardly and outwardly flared sides, and a plunger provided with grooves or recesses in its face, substantially as described.

6. The combination in a press-mold of a base provided with a circumferential, annular rabbet and a smooth upper face, a cap provided with a circumferential, depending, annular flange and a mold with downwardly and outwardly flared sides, and a plunger provided with grooves or recesses in its face, the cap and base being movable in relation to each other without thereby changing the form of the mold, substantially as described.

7. The combination, in a molding apparatus, of a mold-press provided with a recessed plunger, and a coöperating, recessed upsetting-die.

8. The combination, in a molding apparatus, of a mold-press provided with a recessed plunger, and a coöperating upsetting-die provided with inwardly-tapering recesses.

9. The combination, in a molding apparatus, of a mold-press provided with a recessed plunger, and a coöperating upsetting-die provided with an inwardly-tapering recess, of an exterior opening equal to the embracing outline of two of the plunger-recesses.

10. The combination, in a molding apparatus, of a mold-press provided with a plunger having a plurality of molding-recesses therein, and a coöperating upsetting-die provided with a plurality of inwardly-tapering recesses each having an exterior opening equal to the embracing outline of two adjacent plunger-recesses.

11. The combination, in a molding apparatus, of a mold-press provided with a recessed plunger having two pairs of relatively converging molding-grooves therein, and a coöperating upsetting-die provided with two inwardly-tapering recesses each having an exterior opening equal to the outline of one pair of the plunger-recesses.

12. In a molding apparatus an upsetting-die provided with inwardly-tapering recesses in its face.

13. The combination, in a molding apparatus, of a mold-press provided with a recessed member, and a coöperating upsetting-die provided with inwardly-tapering recesses.

14. The combination, in a molding apparatus, of a mold-press provided with a recessed member, and a coöperating, recessed upsetting-die.

WILLIAM PASSMORE MEEKER.

Witnesses:
WM. D. NEILLEY,
WILLIAM H. MOHR.